United States Patent [19]

Ohls

[11] 4,246,299
[45] Jan. 20, 1981

[54] METHOD OF COATING OPTICAL WAVEGUIDE FILAMENTS

[75] Inventor: James W. Ohls, Horseheads, N.Y.

[73] Assignee: Corning Glass Works, Corning, N.Y.

[21] Appl. No.: 46,232

[22] Filed: Jun. 7, 1979

[51] Int. Cl.³ .......................... G02B 1/10; G02B 5/14;
B05D 3/06; B05D 3/02
[52] U.S. Cl. ..................................... 427/54.1; 427/163
[58] Field of Search ............................ 427/54.1, 163

[56] References Cited

U.S. PATENT DOCUMENTS

| | | | |
|---|---|---|---|
| 3,480,458 | 11/1969 | Dislich et al. | 427/163 X |
| 3,623,903 | 11/1971 | Dislich et al. | 427/163 X |
| 3,899,313 | 8/1975 | Grabmaier et al. | 427/163 X |
| 3,930,103 | 12/1975 | Chimura et al. | 427/163 X |
| 4,073,974 | 2/1978 | Albarino et al. | 427/163 |
| 4,076,510 | 2/1978 | Mracek et al. | 427/54.1 X |
| 4,099,837 | 7/1978 | Vazirani | 427/54.1 X |
| 4,125,644 | 11/1978 | Ketley et al. | 427/54.1 X |

Primary Examiner—James R. Hoffman
Attorney, Agent, or Firm—Walter S. Zebrowski; William J. Simmons, Jr.

[57] ABSTRACT

A method of coating an optical waveguide filament employing a die body having an at least partly tapered central aperture and radial means for introducing coating material to the central aperture is disclosed. The method includes exposing the optical waveguide filament to the coating material within the tapered aperture of the die body. The die body and an apparatus for coating the filament is also disclosed.

12 Claims, 3 Drawing Figures

METHOD OF COATING OPTICAL WAVEGUIDE FILAMENTS

BACKGROUND OF THE INVENTION

This invention relates to a substantially continuous method of coating an optical waveguide filament, and more particularly to a method of coating such a filament wherein it comes in contact with the coating material only within the tapered bore portion of the die. A description of glass optical waveguides may be found in U.S. Pat. Nos. 3,659,915, 3,823,995, and 3,884,550, which patents are expressly incorporated herein by reference.

Glass optical waveguides must exhibit high strength in order to withstand the stresses which are encountered in incorporating them into protective sheathing or cable, installing the cable, or in use. While such waveguides are typically quite strong as drawn from a preform or blank, this strength is rapidly degraded by surface defects which are introduced into the waveguide through handling or otherwise.

To preserve the strength of a newly drawn waveguide filament, it is conventional to apply to the waveguide immediately after it is drawn a thin protective coating composed of an organic or inorganic coating material which serves to shield the waveguide during subsequent handling. A variety of coating methods may be used for this purpose, but one common technique is to pass the filament, as it is drawn, into a reservoir of a suitable coating material and out of the reservoir through a small-bore die, often called a coating die. Reference to the use of such a coating die may be found in U.S. Pat. No. 3,980,390 to Yamamoto et al. A flexible waveguide coating die is described by Albarino et al. in U.S. Pat. No. Des. T963,002.

With recent emphasis on increasing waveguide draw speeds, attention has been directed to die design, and the use of coating dies with tapered bores has been proposed. The aforementioned flexible Albarino et al. coating dies have tapered bores, as do the rigid coating dies described by P. W. France et al., in Proc. 3rd European Conference on Optical Fiber Comm., pp. 90–92 (1977). In theory, the fluid dynamics of tapered bores give rise to forces which tend to center the waveguides in the bore, improving coating concentricity.

However, difficulties have been encountered as the filament passes through the coating solution in a tank or reservoir to the die. Turbulence is created which induces air bubbles, which air bubbles upset the alignment of the fiber in the die and the entrapped air becomes embedded in the fiber coating as the bubbles enter the die orifice. Furthermore, other complications caused by contact of the fiber and the coating solution in the tank or reservoir may create coating flaws. It has been found that air becomes entrapped in the coating material due to turbulence created by the passing filament when the filament coating velocity is in excess of approximately 0.5 m./sec. The volocity may vary, however, depending on the type of coating material used. Such embedded air bubbles may weaken the ultimate coated filament and affect its optical properties, as may a variation of coating thickness along the cross-section thereof, the fiber coating being termed "out of round" in the latter case.

SUMMARY OF THE INVENTION

It is an object of this invention to provide a method of coating an optical waveguide filament in a substantially continuous manner so as to prevent entrapment of air bubbles within the coating and between the coating and the filament, as well as eliminating coating flaws which tend to degrade the resulting fiber strength and affect its optical properties.

Another object of this invention is to provide a substantially continuous method of coating optical waveguide filaments with a coating having a substantially uniform thickness and a method which overcomes the disadvantages heretofore noted.

Briefly, according to this invention, a substantially continuous method of coating an optical waveguide filament, an apparatus for coating an optical waveguide filament, a coating die, and the resulting coated optical waveguide filament is disclosed. A coating die defining an at least partly tapered central longitudinal aperture suitable for accommodating a waveguide filament, said central aperture extending from the bottom surface to the top surface of the die body, is provided. The die body also defines at least one radial entrance port communicating with the central longitudinal aperture intermediate the top and bottom surfaces of the body forming a junction with said central longitudinal aperture. The diameter at the exit end of the central longitudinal aperture or the die orifice is predetermined to provide the desired outside diameter of the resulting coated optical waveguide filament. The optical waveguide filament is passed through the at least partly tapered longitudinal aperture. Coating material is introduced into the one or more radial ports and flowed therethrough into the central longitudinal aperture in an amount whereby the coating material fills the at least partly tapered central longitudinal aperture surrounding the filament to a point substantially coincident with the top surface of the die body or a point intermediate said top and bottom surfaces of the die body. The level of the coating material in the central longitudinal aperture is maintained at a point intermediate the top and bottom surfaces of the coating die body but not above the top surface while the filament is passed through the central longitudinal aperture and the coating material contained therein, whereby the filament is coated by the coating material.

These and other objects, features and advantages of the present invention will become apparent to those skilled in the art from the following detailed description and the attached drawings, on which, by way of example, only the preferred embodiments of this invention are illustrated.

DETAILED DESCRIPTION OF THE INVENTION

It is to be noted that the drawings are illustrative and symbolic of the present invention and there is no intention to indicate scale or relative proportions of the elements shown therein.

Figure 1:
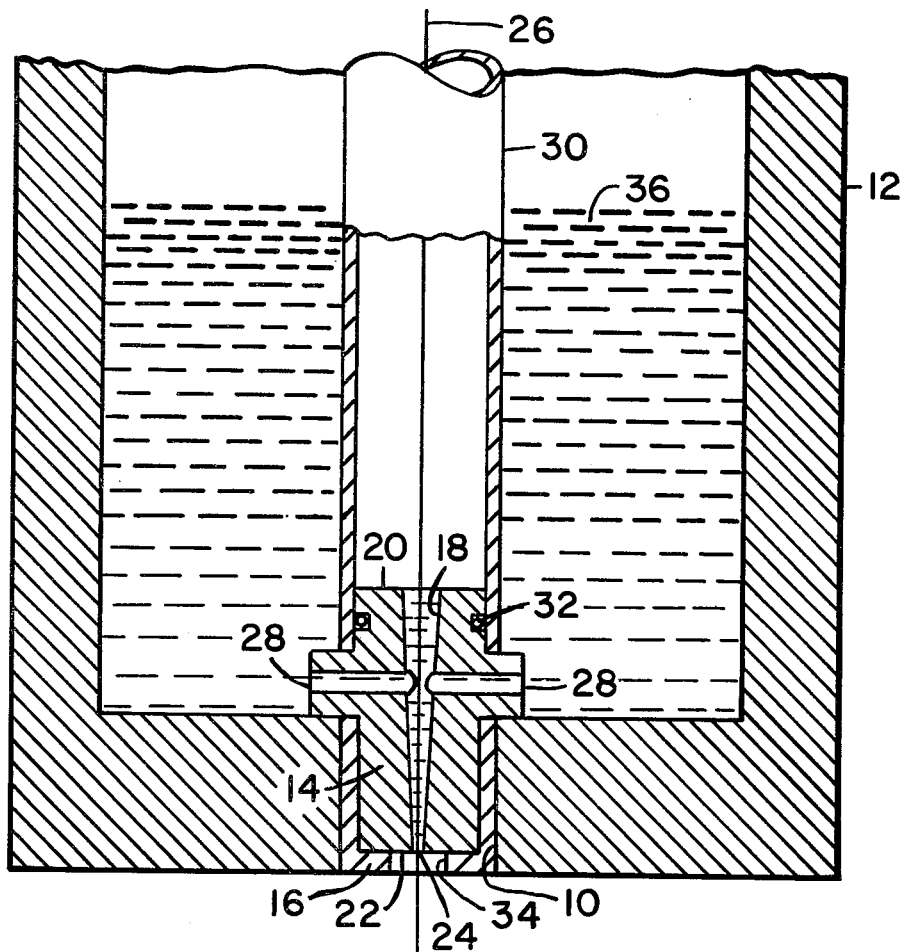
FIG. 1 is a fragmentary elevational view illustrating an apparatus suitable for coating an optical waveguide filament in accordance with the method of the present invention.

Referring to FIG. 1, there is shown an apparatus suitable for practicing the method of the present invention. Within aperture 10 in tank or reservoir 12 there is disposed a die body 14. Die body 14 is fitted within aperture 10 employing a standard die holder 16 formed of "Delrin", "Nylon", aluminum, or any other suitable and compatible plastic or metal. Such die holders are well known in the art and do not form part of the present invention.

Figures 2, 3:
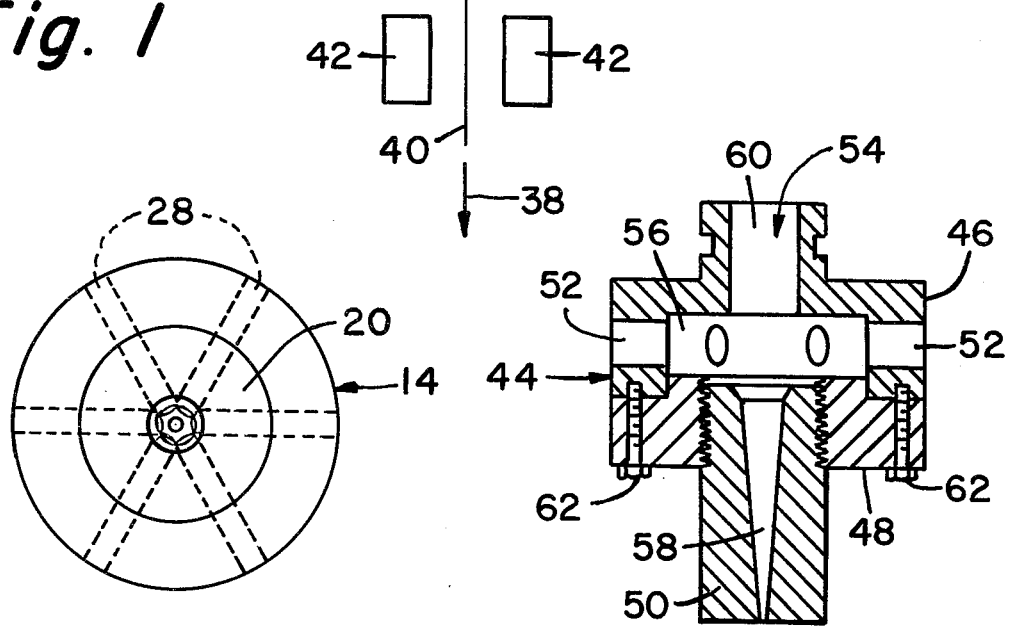
FIG. 2 is a plan view of a coating die suitable for use in the method of the present invention.
FIG. 3 is an elevational, cross-sectional view of a coating die of the present invention illustrating other embodiments thereof.

Referring additionally to FIG. 2, die body 14 defines a tapered longitudinal aperture 18 which may extend from top surface 20 to the bottom surface 22 of die body 14 or some lesser portion thereof as hereinafter described, with the remainder of the aperture being cylindrical. Opening 24 in the bottom surface 22 of die body 14, caused by the end of tapered longitudinal aperture 18, is generally referred to as the die bore or die orifice. The size of die bore 24 as well as the taper of tapered longitudinal aperture 18 is determined by various parameters including the size of filament 26 which is to be coated, the thickness of the desired coating, the coating material, the viscosity of the coating material, and other parameters described herein.

One or more radial ports 28 are formed within die body 14 intermediate top surface 20 and bottom surface 22. The present invention contemplates one or more radial ports 28 formed in die body 14 so as to provide communication from the exterior of die body 14 to tapered longitudinal aperture 18. The size of radial ports 28 are at least in part dependent upon the filament draw rate, the die bore, and the filament diameter, as well as the coating material viscosity and other parameters described herein.

A shield 30 is disposed about die body 14 and sealed by means of an O-ring or other seal 32 so as to prevent leakage into the interior of shield 30 as herein described. Shield 30 may be formed of any suitable material such as glass, plastic, metal, or the like, the material of shield 30 is not critical so long as it is compatable with the coating material. As will be understood, a transparent shield material will facilitate threading the filament through the die body. It is to be noted that aperture 34 is provided within die holder 16 of a size substantially larger than die bore 24 so as to prevent any interference or contact between the coated filament and die holder 16.

Other embodiments of the present invention are illustrated in FIG. 3. In the Figure there is shown a multipart die body 44, comprising a feed cap 46, die block 48, and die 50. Numerous variations of the teaching in connection with FIGS. 1 and 2 are incorporated. For example, when the coating material is of such type and viscosity as to require relatively large radial ports 52 to permit sufficient flow into central longitudinal aperture 54 as hereinabove described, (filament draw rate, die bore size, and filament diameter also affect the size of radial ports 52), ports 52 may be so large as to intersect before reaching aperture 54. In such case or whenever desired, a manifold section 56 may be formed having a diameter sufficient to permit the formation of large radial ports 52 without interference with one another. Manifold 56 is thereby located at the junction of radial ports 52 and aperture 54. Ports 52 are illustrated as cylindrical, however the cross-sectional shape thereof is not critical and they may be oval, elliptical, oblong or any other desired shape.

Another variation may comprise a tapered portion 58 of central longitudinal aperture 54 only within die 50 while portion 60 of aperture 54 within feed cap 46 may be cylindrical in nature. That is, central longitudinal aperture 58 is tapered only below the heretofore described junction. A further variation is that die body 44 may be dismantled for cleaning by unscrewing die 50 from die block 48, and removing threaded fasteners 62 to separate feed cap 46 from die block 48. With die 50 being separable from the remainder of die body 44, different sized dies 50 may be employed to accommodate different sized filaments, different types of coating materials, and variations in desired coating thickness.

Still another variation is that the entrance to tapered portion 58 may be beveled, as illustrated by reference numeral 64, to facilitate threading the filament through the die. This can also be employed in connection with die body 14 illustrated in FIG. 1 wherein the bevel would be formed in surface 20 at the entrance to aperture 18.

It will be understood that all of the variations illustrated in FIG. 3 need not be employed at the same time, rather any one or any combination thereof may be used, and they may be used in connection with die body 14 illustrated in FIG. 1 when applicable and desired.

The method of coating an optical waveguide filament in accordance with the present invention illustrated in FIGS. 1 and 2 is described as follows. It will be understood that the method would be substantially the same in connection with the embodiment illustrated in FIG. 3. A glass filament is threaded through shield 30 and central longitudinal aperture 18 in die body 14 until it extends through die bore 24 beyond the tapered portion of central longitudinal aperture 18. A quantity of coating material 36 is disposed within tank or reservoir 12 surrounding shield 30 and the exposed portion of die body 14. Although the present invention is in no way limited to any specific coating material, illustrative examples of coating materials are lacquer, curable silicones, acrylics, or the like. Coating material 36 is allowed to flow through radial ports 28 and at least partly fill central longitudinal aperture 18. The level of coating material within central longitudinal aperture 18 should preferably be between the junction formed by the intersection of radial ports 28 and tapered longitudinal aperture 18, and the top surface 20 of die body 14. By maintaining the level of coating material within the limited space of central longitudinal aperture 18, turbulence within coating material 36, which causes entrapment of air bubbles, is greatly reduced or entirely eliminated. An important consideration with respect to the amount of coating material flowed into the central aperture is that the amount be sufficient to prevent the die from being "starved", that is the amount of coating material within the central aperture is insufficient to fully coat the filament. Therefore, the level of coating material within the central aperture should be maintained such that the filament is fully coated yet the level should not be above the aperture or the top die surface where air entrapment can take place.

Filament 26 is then drawn in the longitudinal direction illustrated by arrow 38 whereupon coating material 36 is adhered to the exterior surface of filament 26 and is then properly sized by die bore 24 resulting in coated filament 40. Uncoated filament 26 and coated filament 40 are drawn through die body 14 by means of drawing apparatus well known in the art and not shown. The drawing apparatus does not comprise part of the present invention.

After coated filament 40 leaves die bore 24, it may be passed between heaters 42 to cure the coating material. It will be understood, that heaters 42 similarly do not form an essential part of the present invention since coating materials may be used which do not require heating for curing, such as ultraviolet (UV) light cured materials or air cured organic materials. After the coating material is cured, coated filament 40 then passes to the next processing step such, for example, as reeling onto a reel, application of additional coating material, formation into a cable, or the like.

It will be understood that radial ports 24 must be of a size such that sufficient coating material will flow therethrough into central longitudinal aperture 18 to maintain the desired level of coating material within aperture 18 while it is being applied to filament 26. In the determination of the size and number of radial ports 28, the viscosity of coating material 46, the velocity of filament 26, the desired thickness of coating material 36 to be applied to filament 26, and other like parameters must be considered.

A specific example of a substantially continuous method of coating an optical waveguide filament and apparatus therefor is as follows. A coating tank or reservoir having a diameter of approximately 2½ inches by 5 inches in length is provided. A die body such as illustrated in FIGS. 1 and 2 having a tapered longitudinal aperture formed therein with a diameter of 0.156 inch at the top surface and a diameter of 0.009 inch at the bottom surface was fitted into a standard "Delrin" die holder within the coating tank or reservoir. Six radial ports having a diameter of 0.040 inch were formed approximately 0.437 inch from the top surface of the die body at a substantially uniform radial spacing. A filament having a diameter of 125 μm was fed through the tapered longitudinal aperture within the die body and the reservoir was filled with cellulose acetate lacquer to a depth of 2½ to 3 inches above the radial ports. The filament was drawn at a velocity between 0.75 to 1.3 meters/second resulting in a coating thickness of 5 microns after curing. The coated filament so formed was substantially free of any air bubbles in the coating, although, when the filament was drawn at velocities between 1.0 and 1.3 meters/second some surface flaws were experienced due to improperly cured lacquer resulting from the faster travel through the dryer.

In another example of the present invention, a die having a tapered longitudinal aperture as described in the proceeding example was used, however, six radial ports having a diameter of 0.062 inch were formed therein. The diameter of the tapered longitudinal aperture at the top surface was 0.156 inch and the diameter of the bore hole was 0.010 inch. The filament diameter was 125 μm. The tank or reservoir was filled with silicone material to a depth of 2½ to 3 inches above the radial ports and the filament was drawn through a range of velocities from 0.4 to 1.0 meters/second resulting in an average coating thickness of 50 microns. Similarly, in this example, no embedded air bubbles were found in the coating.

A still further example of the present invention is as follows. A coating tank or reservoir as hereinabove described was provided. A multi-part die body is illustrated in FIG. 3 having a tapered central longitudinal aperture formed in the die only was used. The diameter of the central tapered aperture at the top surface of the die was 0.094 inch while the die bore was 0.018 inch. The die body was fitted into a standard "Delrin" die holder within the coating tank. Six radial ports having a diameter of 0.140 inch were formed in the feed cap portion of the die body terminating in a manifold formed therein at the interior surface thereof. A filament having a diameter of 125 μm was fed through the central aperture and the reservoir was filled with silicone to a depth of 2½ to 3 inches above the radial ports. The filament was drawn at a rate of 0.4 to 1.5 meters/second resulting in an average coating thickness of 105 μm after curing by heat. The coating so formed was substantially free of air bubbles.

In still another example of the present invention, a multi-part die body and reservoir as described in the preceding example was used, however, six radial ports having a diameter of 0.140 inch were formed therein, the tapered central aperture diameter at the top surface of the die was 0.094 inch, while the die bore was 0.012 inch. The filament diameter was 125 μm. The tank or reservoir was filled with UV curable acrylate to a depth of 2½ to 3 inches above the radial ports. The filament was drawn through a range of velocities from 0.2 to 0.7 meter/second resulting in an average coating thickness of 0.58 μm after curing with ultraviolet light. The coating so formed was substantially free of air bubbles.

Although the present invention has been described with respect to specific details of certain embodiments thereof it is not intended that such details be limitations upon the scope of the invention except insofar as set forth in the following claims.

I claim:

1. A method of coating an optical waveguide filament comprising the steps of
   providing a coating die body defining an at least partly tapered central longitudinal aperture suitable for accommodating a waveguide filament extending from the bottom surface to the top surface of said body, said body also defining at least one radial entrance port communicating with said central longitudinal aperture intermediate said top and bottom surfaces of said body forming a junction with said central longitudinal aperture, the diameter at the exit end of said central longitudinal aperture being a function of the outside diameter of the desired coated optical waveguide filament,
   passing said optical waveguide filament through said central longitudinal aperture,
   introducing coating material into said radial port,
   flowing said coating material through said radial port into said central longitudinal aperture in an amount whereby said coating material fills said central longitudinal aperture surrounding said filament to a point substantially coincident with the top surface of said body or a point intermediate said top and bottom surfaces of said body, and
   maintaining the level of said coating material in said central longitudinal aperture at a point intermediate said top and bottom surfaces of said coating die body but not above said top surface while said filament is passed through said central longitudinal aperture and said coating material contained therein whereby said filament is coated by said coating material.

2. The method of claim 1 further comprising disposing said die body within a reservoir containing a quantity of coating material, and providing means to separate said quantity of coating material from said central longitudinal aperture, said coating material flowing into said central longitudinal aperture only through said radial port.

3. The method of claim 2 wherein said means comprise a shield disposed about said die body.

4. The method of claim 1 further comprising the step of pulling said optical waveguide filament through said central longitudinal aperture of said die body and the coating material contained therein.

5. The method of claim 1 further comprising the step of providing a coating die body defining a plurality of spaced radial entrance ports.

6. The method of claim 1 further comprising the step of maintaining said optical waveguide filament substantially centered within the exit end of said central longitudinal aperture to facilitate applying a substantially uniform coating of said coating material to the exterior surface of said optical waveguide filament.

7. The method of claim 1 further comprising the step of curing said coating material after the coated optical waveguide filament passes out from said tapered longitudinal aperture.

8. The method of claim 7 wherein said curing is facilitated by exposing said coating material to a heat source.

9. The method of claim 7 wherein said curing is facilitated by exposing said coating material to ultraviolet light.

10. The method of claim 7 wherein said curing is facilitated by exposing said coating material to air.

11. The method of claim 1 wherein said central longitudinal aperture is tapered only below said junction.

12. The method of claim 1 wherein said central longitudinal aperture is tapered from said bottom surface to said top surface.

* * * * *